(12) United States Patent
Greenberg et al.

(10) Patent No.: US 11,154,074 B2
(45) Date of Patent: Oct. 26, 2021

(54) MODULAR REFRIGERATION SUBSYSTEMS FOR FROZEN CARBONATED BEVERAGE SYSTEMS

(71) Applicant: Cornelius, Inc., Osseo, MN (US)

(72) Inventors: Jacob C. Greenberg, Elgin, IL (US); Zachary Dresser, West Chicago, IL (US); Austen Siwiec, Naperville, IL (US); Sandip P. Chougale, Bangalore (IN)

(73) Assignee: Cornelius, Inc., Osseo, MN (US)

( * ) Notice: Subject to any disclaimer, the term of this patent is extended or adjusted under 35 U.S.C. 154(b) by 85 days.

(21) Appl. No.: 16/673,067

(22) Filed: Nov. 4, 2019

(65) Prior Publication Data
US 2021/0059274 A1 Mar. 4, 2021

(51) Int. Cl.
*A23G 9/22* (2006.01)
*A23G 9/16* (2006.01)
(Continued)

(52) U.S. Cl.
CPC ............. *A23G 9/222* (2013.01); *A23G 9/045* (2013.01); *A23G 9/163* (2013.01); *F25D 31/002* (2013.01)

(58) Field of Classification Search
CPC ........ A23G 9/222; A23G 9/045; A23G 9/228; A23G 9/10; A23G 9/227; A23G 9/16; A23G 9/163; F25D 31/002
See application file for complete search history.

(56) References Cited

U.S. PATENT DOCUMENTS

| 5,103,649 A * | 4/1992 | Kieffer ................... A23G 9/045 366/145 |
| 6,220,047 B1 | 4/2001 | Vogel et al. |

(Continued)

FOREIGN PATENT DOCUMENTS

WO 2017072531 A1 5/2017

OTHER PUBLICATIONS

Eaton, "Blind-Mate Quick Disconnect Couplings", http://www.saywell.co.uk/wp-content/uploads/2011/09/TF100-33E_Blind-Mate_Quick_Disc_Coupling.pdf. Mar. 2013 (Year: 2013).*

(Continued)

*Primary Examiner* — Cassey D Bauer
(74) *Attorney, Agent, or Firm* — Andrus Intellectual Property Law, LLP

(57) ABSTRACT

A refrigeration subsystem removably received within a base machine to cool an object. The subsystem includes a body with an opening that receives the object. An evaporator thermally communicates with the object, which is cooled by refrigerant flowing through the evaporator. A compressor receives the refrigerant downstream of the evaporator and increases a refrigerant pressure. A condenser receives the refrigerant downstream of the compressor, which cools the refrigerant. An expansion device receives the refrigerant downstream of the condenser and decreases its pressure, the evaporator being downstream from the expansion device. A refrigerant circuit fluidly couples the evaporator, compressor, condenser, and expansion device such that the refrigerant flows therebetween, all of which are coupled to the body and move together therewith. The refrigerant circuit forms a closed loop that remains unbroken when the body of the refrigerant subsystem is removed from the base machine.

17 Claims, 14 Drawing Sheets

(51) Int. Cl.
    *A23G 9/04*         (2006.01)
    *F25D 31/00*      (2006.01)

(56) References Cited

U.S. PATENT DOCUMENTS

| | | |
|---|---|---|
| 6,553,779 B1 | 4/2003 | Boyer et al. |
| 6,830,239 B1 | 12/2004 | Weber et al. |
| 9,174,833 B2 | 11/2015 | Yang et al. |
| 9,656,849 B2 | 5/2017 | Hawken |
| 2002/0108964 A1 | 8/2002 | Staten et al. |
| 2017/0089630 A1 | 3/2017 | Jayaram |
| 2017/0146289 A1 | 5/2017 | Cui et al. |
| 2018/0106515 A1 | 4/2018 | Cobabe et al. |

OTHER PUBLICATIONS

Positronic, "Blind Mate Connector" https://www.connectpositronic.com/en/blind-mate-connector/, accessed Mar. 25, 2021, archived Nov. 23, 2017. (Year: 2017).*
True MFG, "Natural Refrigerant", https://www.truemfg.com/AboutUs/Natural-Refrigerant, accessed Mar. 25, 2021 archived Nov. 13, 2015. (Year: 2015).*
International Search Report and Written Opinion for International Patent Application No. PCT/US2020/047765, dated Nov. 4, 2020.

* cited by examiner

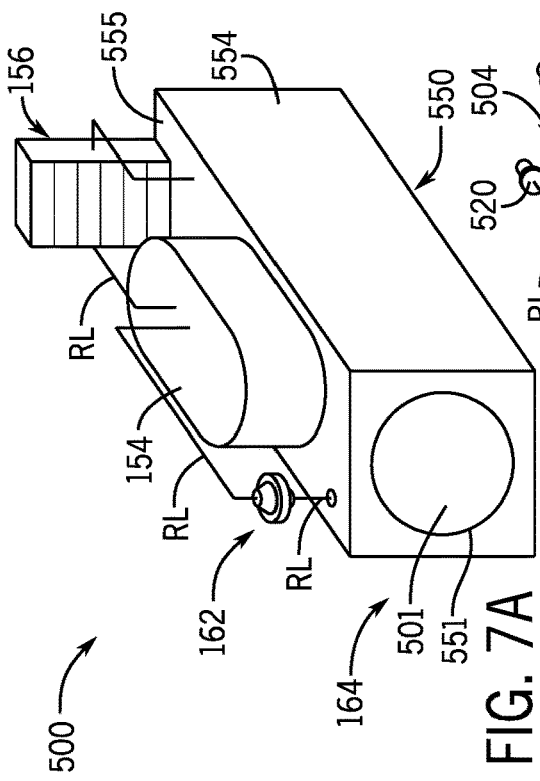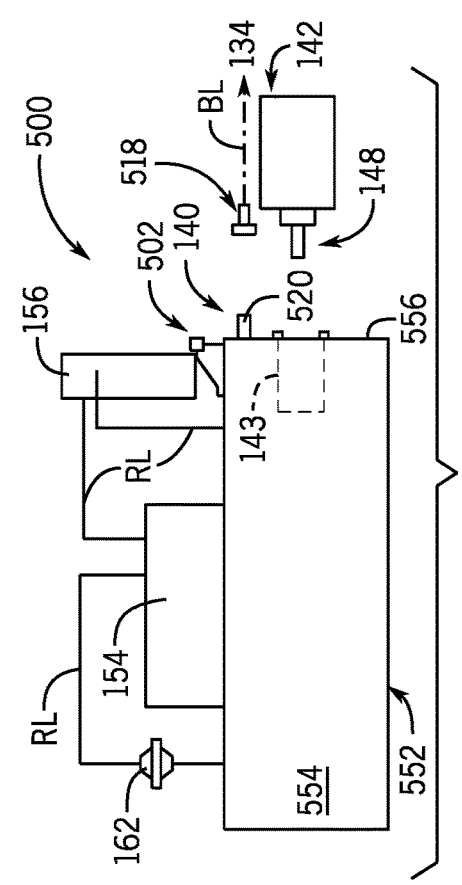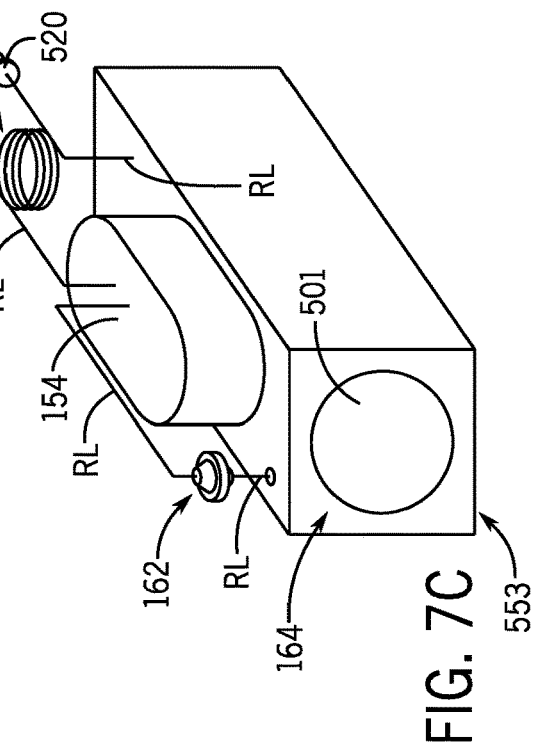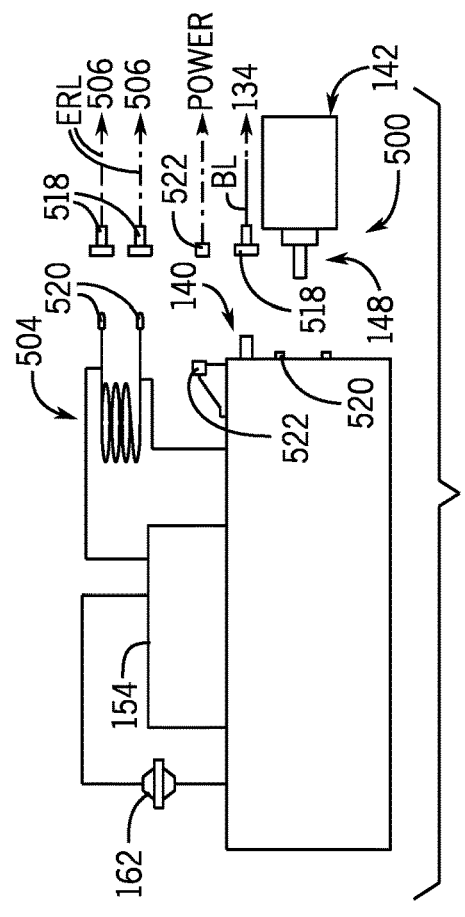

MODULAR REFRIGERATION SUBSYSTEMS FOR FROZEN CARBONATED BEVERAGE SYSTEMS

FIELD

The present disclosure generally relates to frozen carbonated beverage systems, and more particularly to refrigeration subsystems for frozen carbonated beverage systems.

BACKGROUND

The following U.S. patents and patent applications provide background information and are incorporated by reference in entirety.

The following U.S. patents and patent applications are incorporated herein by reference:

U.S. Pat. No. 5,103,649 discloses improvements in the electronic control of frozen carbonated beverage machines and defrost heaters therein. A control scheme is shown that provides for accurately determining the viscosity of a semi-frozen beverage as a function of the torque of a drive motor. The viscosity scale has a zero value when the beverage is known to be completely liquid. Viscosity is maintained within a narrow range based upon pre-defined three level low, medium and high viscosity sets, and wherein compressor short-cycling is eliminated.

U.S. Pat. No. 6,220,047 discloses a dual purpose carbonator/blending bottle connected to a source of beverage syrup, a source of potable water and to a source of pressurized carbon dioxide gas. The dual purpose bottle is retained within an ice bank water bath tank. A pair of ratio valves provide for metering the water and syrup at a desired ratio. A refrigeration system provides for cooling an evaporator located in the water tank for forming the ice bank thereon. The carbonated beverage then flows from the bottle into a freeze cylinder. A scraping mechanism within the cylinder provides for scraping frozen beverage from the inner surface of the cylinder. A control mechanism provides for controlling the refrigeration system and the cooling of both evaporators.

U.S. Pat. No. 6,830,239 discloses a carbonator tank that includes a liquid inlet, a gas inlet and a liquid outlet. A liquid level sensor includes a liquid level sensing portion extending along and within the interior of the carbonator and provides for determining a full and minimal liquid level therein. The liquid then flows into the carbonator interior and contacts a deflection plate and is deflected thereby so that such liquid flow does not disrupt the operation of the level sensing portion of the level sensor.

U.S. Pat. No. 9,174,833 discloses a beverage dispense apparatus that maintains syrup containers in a housing, thereby eliminating plumbing required by prior art Bag-in-Box dispensers.

U.S. Pat. No. 9,656,849 discloses a valve dispensing system that can be used in a beverage dispenser. In particular, the valve dispensing system has individual valve module components that control the flow of a beverage or beverage component, and a plurality of valve module components may be combined to form a system capable of dispensing a plurality of beverages and/or beverage components.

PCT Application Publication No. WO2017072531 discloses a beverage cooling system that includes a cooling tank configured to receive a cooling media, a first cooling coil positioned in the cooling tank such that the cooling media contacts the first cooling coil, a refrigeration module coupled to the first cooling coil and configured to circulate a first coolant through the first cooling coil to thereby cool the cooling media, and a pair of couplers that removably couple the refrigeration module to the first cooling coil such as to isolate the first coolant in the first cooling coil when the refrigeration module is uncoupled from the first cooling coil.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a refrigeration subsystem configured to be removably received within a base machine to cool an object. The refrigeration subsystem includes a body that defines an opening configured to at least partially receive the object therein. An evaporator is configured to thermally communicate with the object, where the object is cooled by the refrigerant flowing through the evaporator. The evaporator is coupled to the body and moves therewith. A compressor receives the refrigerant downstream of the evaporator and increases a pressure of the refrigerant. The compressor is coupled to the body and moves therewith. A condenser receives the refrigerant downstream of the compressor, where the refrigerant is cooled by flowing through the condenser. The condenser is coupled to the body and moves therewith. An expansion device receives the refrigerant downstream of the condenser and decreases the pressure of the refrigerant, where the evaporator receives the refrigerant downstream from the expansion device. The expansion valve is coupled to the body and moves therewith. A refrigerant circuit fluidly couples the evaporator, the compressor, the condenser, and the expansion device such that the refrigerant flows therebetween. The refrigerant circuit forms a closed loop that remains unbroken when the body of the refrigerant subsystem is removed from the base machine.

Another embodiment of the present disclosure generally relates to a refrigeration system for cooling an object. The refrigeration system includes a refrigeration subsystem that includes a body that defines an opening configured to at least partially receive the object therein. The refrigeration subsystem further includes an evaporator configured to thermally communicate with the object, where the object is cooled by the refrigerant flowing through the evaporator. The evaporator is coupled to the body and moves therewith. The refrigeration subsystem further includes a compressor that receives the refrigerant downstream of the evaporator and increases a pressure of the refrigerant, where the compressor is coupled to the body and moves therewith. The refrigeration subsystem further includes a condenser that receives the refrigerant downstream of the compressor, where the refrigerant is cooled by flowing through the condenser, and where the condenser is coupled to the body and moves therewith. The refrigeration subsystem further includes an expansion device that receives the refrigerant downstream of the condenser and decreases the pressure of the refrigerant, where the evaporator receives the refrigerant downstream from the expansion device, and where the expansion device is coupled to the body and moves therewith. The refrigeration subsystem further includes a refrigerant circuit that fluidly couples the evaporator, the compressor, the condenser, and the expansion device such that the refrigerant flows therebetween. The refrigeration system further includes a base machine configured to removably receive the refrigeration subsystem. The refrigerant circuit forms a closed loop that remains unbroken when the body of the refrigerant subsystem is removed from the base machine.

BRIEF DESCRIPTION OF THE DRAWINGS

The drawings illustrate embodiments for carrying out the disclosure. The same numbers are used throughout the drawings to reference like features and like components. In the drawings:

FIGS. 7A and 7B depict isometric and side views of a first exemplary refrigeration subsystem according to the present disclosure;

FIGS. 7C and 7D depict isometric and side views of a second exemplary refrigeration subsystem according to the present disclosure;

DETAILED DISCLOSURE

Figure 1:
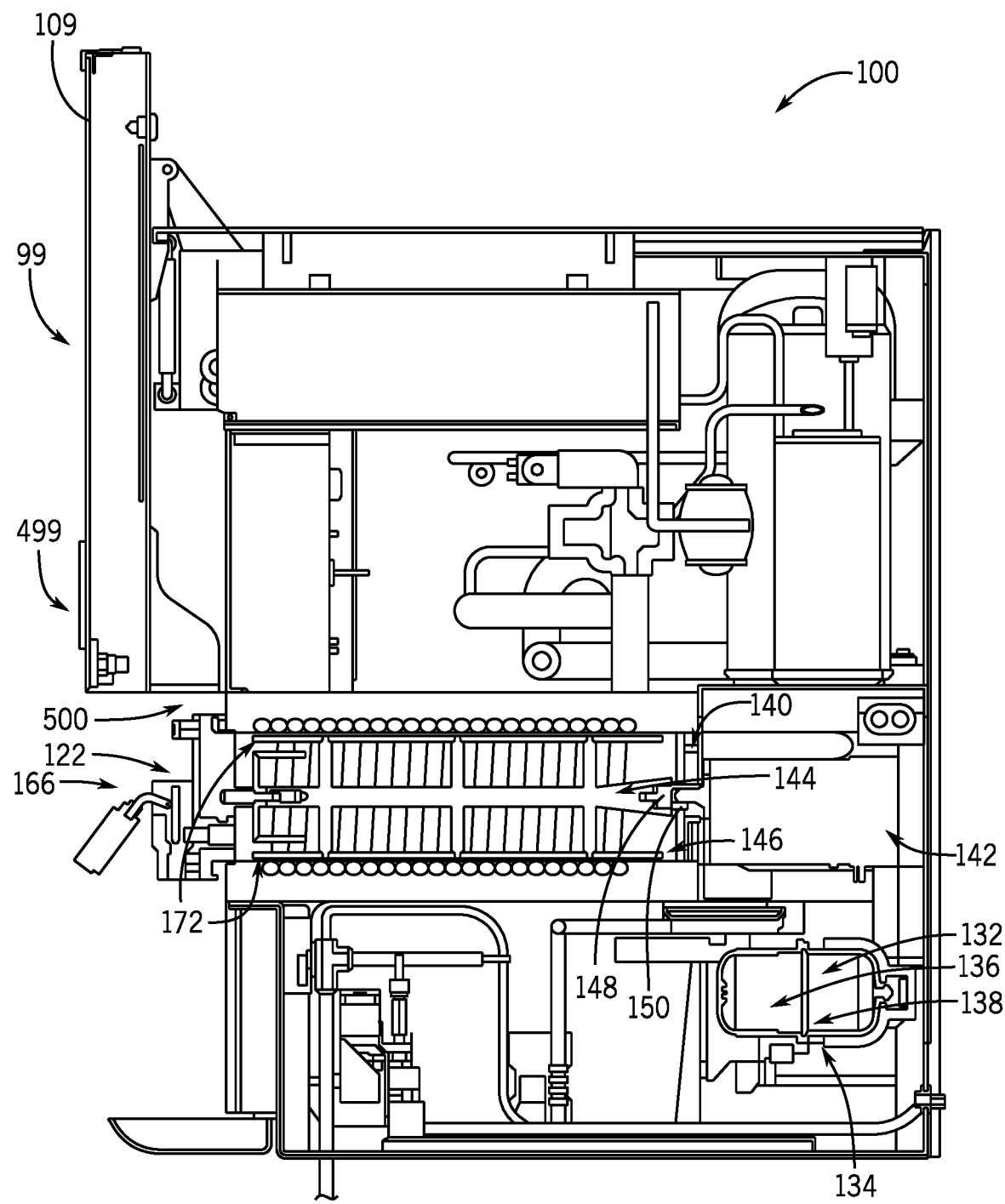
FIG. 1 is a sectional side view of an exemplary frozen carbonated beverage system according to the present disclosure.
Figure 2:
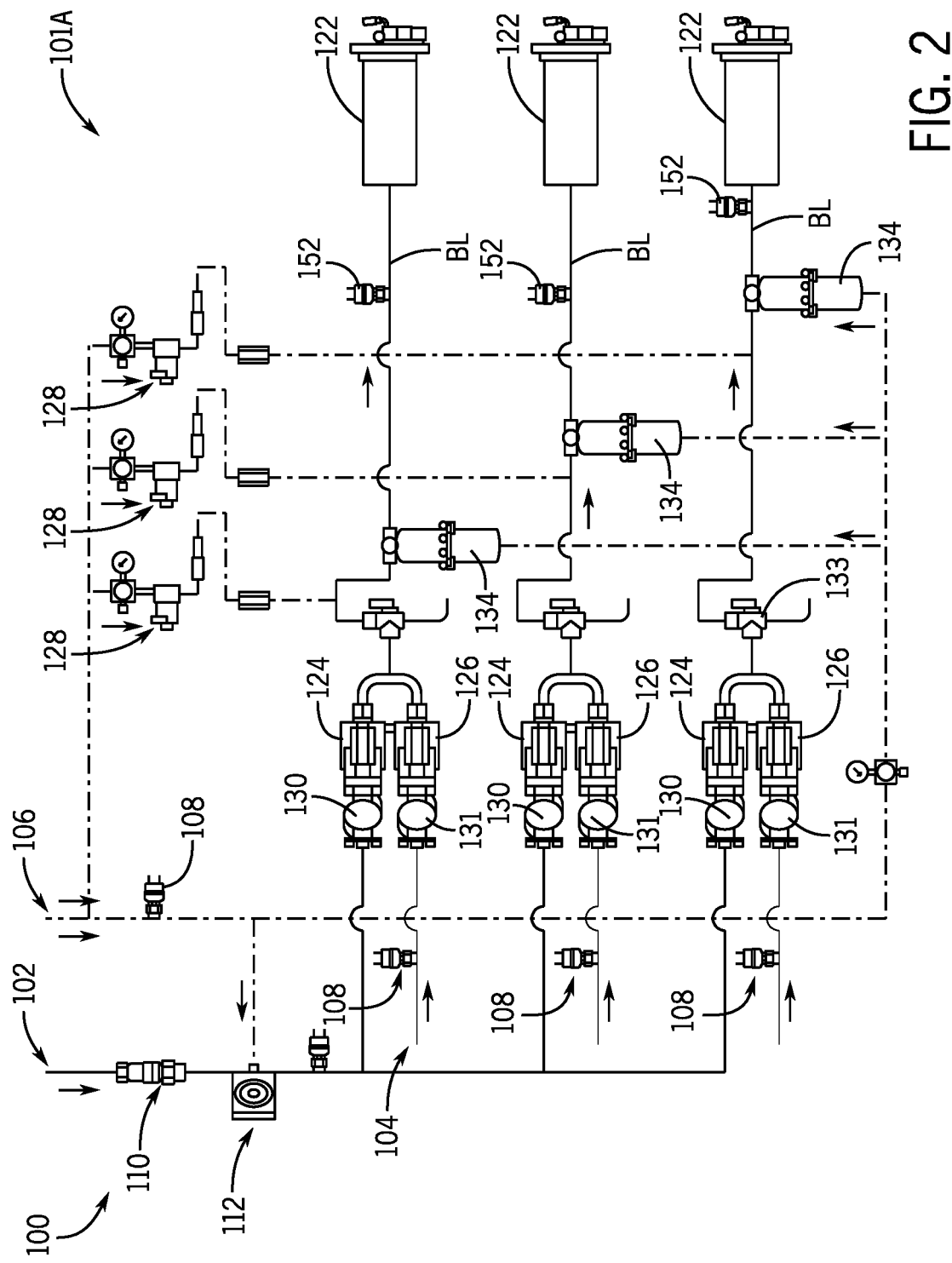
FIGS. 2 and 3 depict schematic views of exemplary beverage production and refrigeration systems for frozen carbonated beverage systems according to the present disclosure, respectively.
Figure 3:
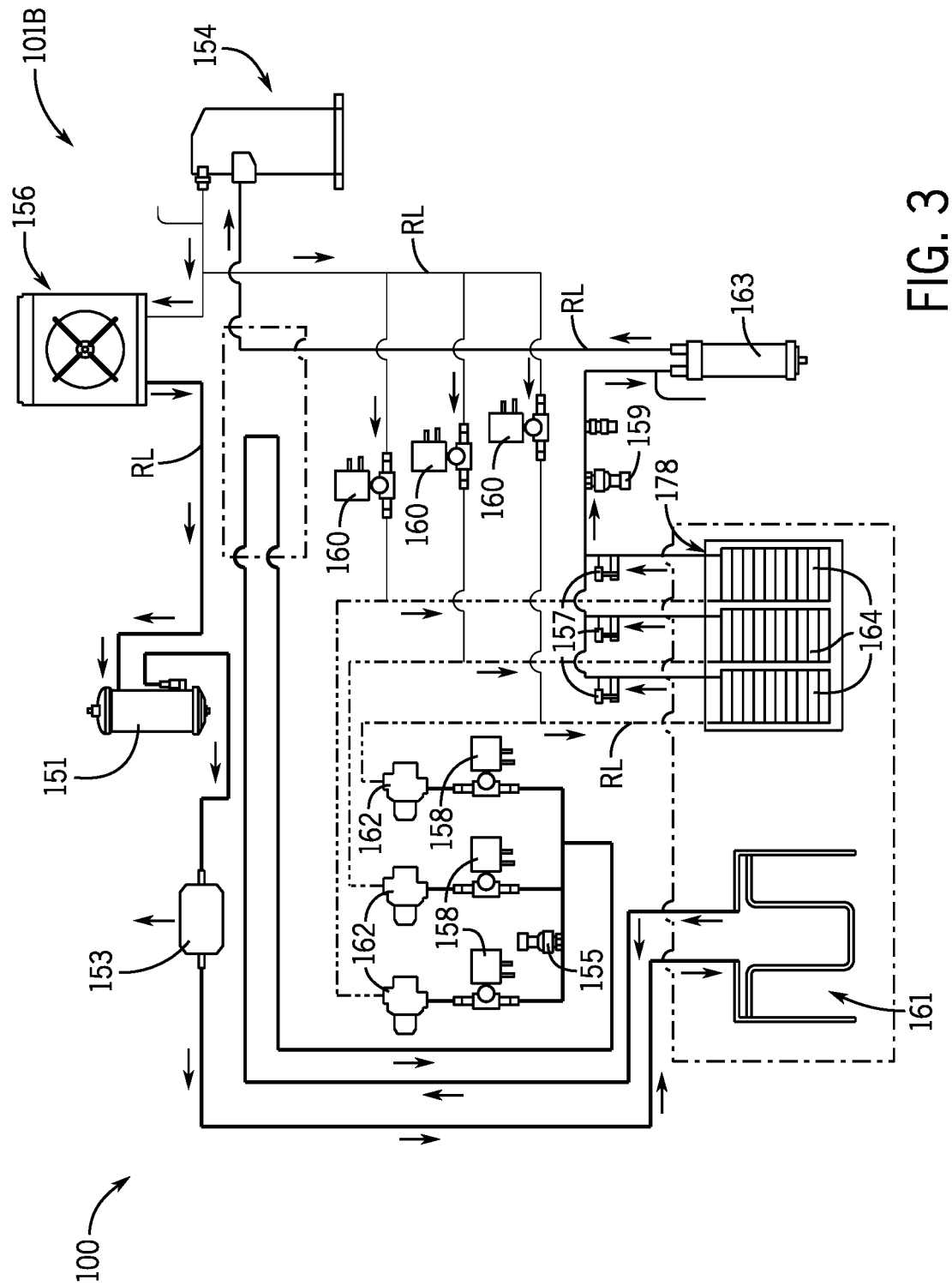

The present disclosure generally relates to systems and methods for dispensing frozen carbonated beverages (FCBs), such as may be offered at a food or beverage service provider, a convenience store, or the like. An exemplary system 100 for producing and dispensing FCBs according to the present disclosure is shown in FIGS. 1-3. FIG. 1 shows an exemplary dispensing machine 99, which prepares and stores a beverage within a barrel 122 until the beverage is dispensed via a dispense valve 166. In certain examples, selections for the beverage to be dispensed are made using a user interface 109.

A motor 142 rotates a beater bar 144 and scraper blades 146 attached thereto. In systems 100 known in the art, the beater bar 144 is rotated at a fixed speed (i.e., 168 RPM). The motor 142 is coupled to the beater bar 144 via a motor coupling shaft 148 that passes through a rotary barrel seal 150. An expansion tank is also provided between supply lines 107 and a barrel inlet 140 defined within the barrel 122. The power required for the motor 142 to rotate the beater bar 144 and the scraper blades 146 through the mixture contained within the barrel 122 is monitored by a control system (FIG. 6, discussed below) having a processing system 610 and memory system 630. This power consumption is then used to estimate the viscosity of product within the barrel 122.

The system 100 includes a beverage production system 101A (FIG. 2) and a refrigeration system 101B (FIG. 3). In the beverage production system 101A of FIG. 2, pressurized water 102, syrup concentrate 104, and $CO_2$ 106 (collectively, supply lines 107) are supplied to the system 100. Pressures are monitored by "sold out" pressure switches 108 connected to each of the supply lines 107. The pressure of the water 102 entering the system 100 is controlled by reducing the pressure through a regulator 110, then increasing the pressure with a $CO_2$ powered pump 112 to yield a consistent and known final pressure. The pressure provided by this $CO_2$ powered pump 112 is a function of inlet $CO_2$ pressure.

In a similar manner, pressure for the syrup concentrate 104 is supplied by a $CO_2$ powered pump 114, whereby pressure is again provided as a function of inlet $CO_2$ pressure as controlled by a regulator. The resulting pressure of syrup concentrate 104 at the dispensing machine 99 (FIG. 1) is a function of the pressure provided by the $CO_2$ powered pump 114, the distance in elevation between the pump 114 and the dispensing machine 99, tubing diameters for the supply lines 107, syrup concentrate 104 viscosity, the number of splices or joints in the supply lines 107, and other factors.

Continuing with FIG. 2, the pressure of incoming $CO_2$ 106 is controlled by a regulator, which for certain systems 100 is set at 75 psig. Supply pressures may drop for multiple reasons. Since all supply lines 107 may incorporate the use of $CO_2$ 106 as described above (i.e., via $CO_2$ powered pumps 112 and 114), a reduction in $CO_2$ 106 supply pressure can affect all supply lines 107. This can occur when the contents of the $CO_2$ 106 tank are depleted, when there is an increased draw on the $CO_2$ 106 tank from other dispensing machines 99 or other devices sharing common $CO_2$ 106, or an increased draw from a single dispensing machines 99, such as if multiple barrels 122 are filled simultaneously as part of a standard maintenance activity, for example. Additional information about beverage production systems 101A and refrigeration systems 101B is also provided in U.S. Pat. No. 6,220,047, which is incorporated by reference herein.

When one of the supply lines 107 is depleted, the pressure of that supply line 107 will drop below a "cut off" pressure as read by a pressure switch 108. A control system 600 (FIG. 6) receives inputs from the pressure switch 108 and compares these pressure values to "cut in" and "cut off" values. If the pressure is below the "cut off" pressure, the control system 600 determines that the supply is "sold out." The control system 600 then signals the need for the supply to be replenished until the supply pressure is determined to be above a "cut in" pressure as read by the pressure switch 108.

Figure 4:
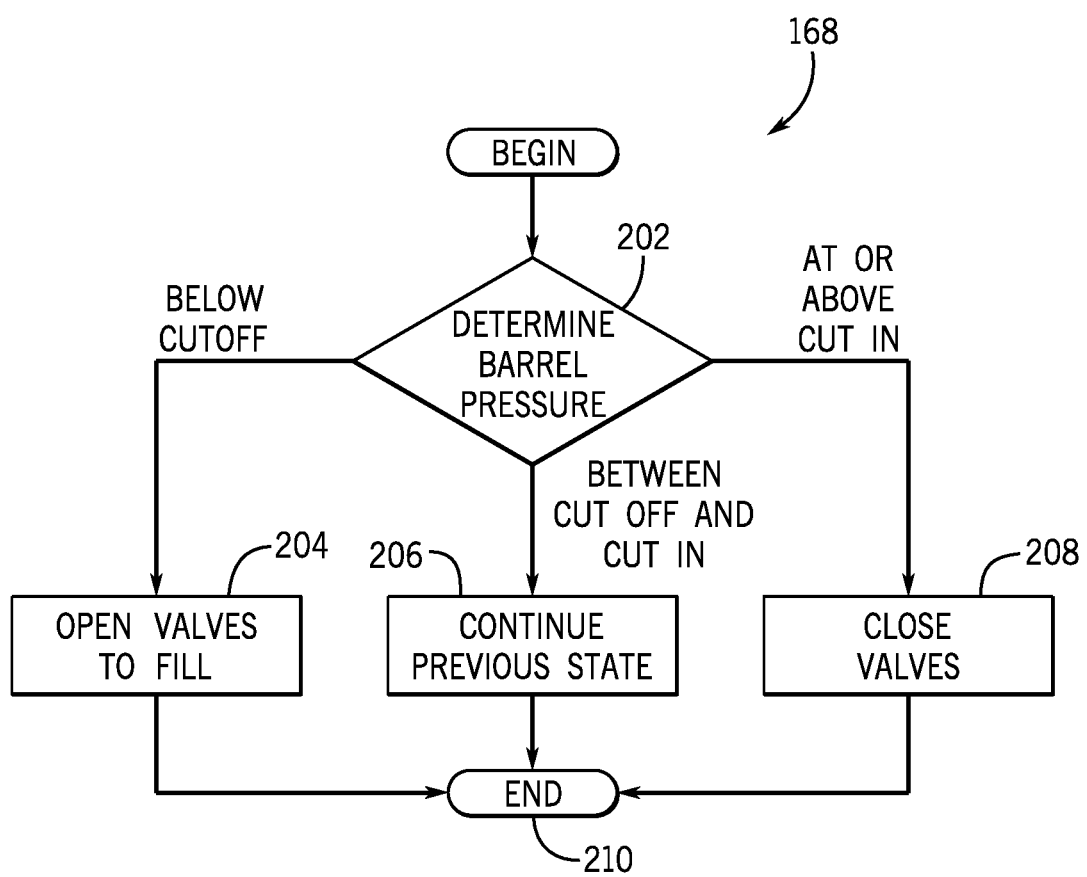
FIG. 4 depicts an exemplary process flow for filling a frozen carbonated beverage system according to the present disclosure.

When the control system 600 determines that the pressure of the supply line 107 has surpassed the cut in pressure, the control system will no longer indicate that the supply line 107 is "sold out." The fill process 168 for this beverage production system 101A (FIG. 2) is shown in FIG. 4, which is discussed further below.

Figure 6:
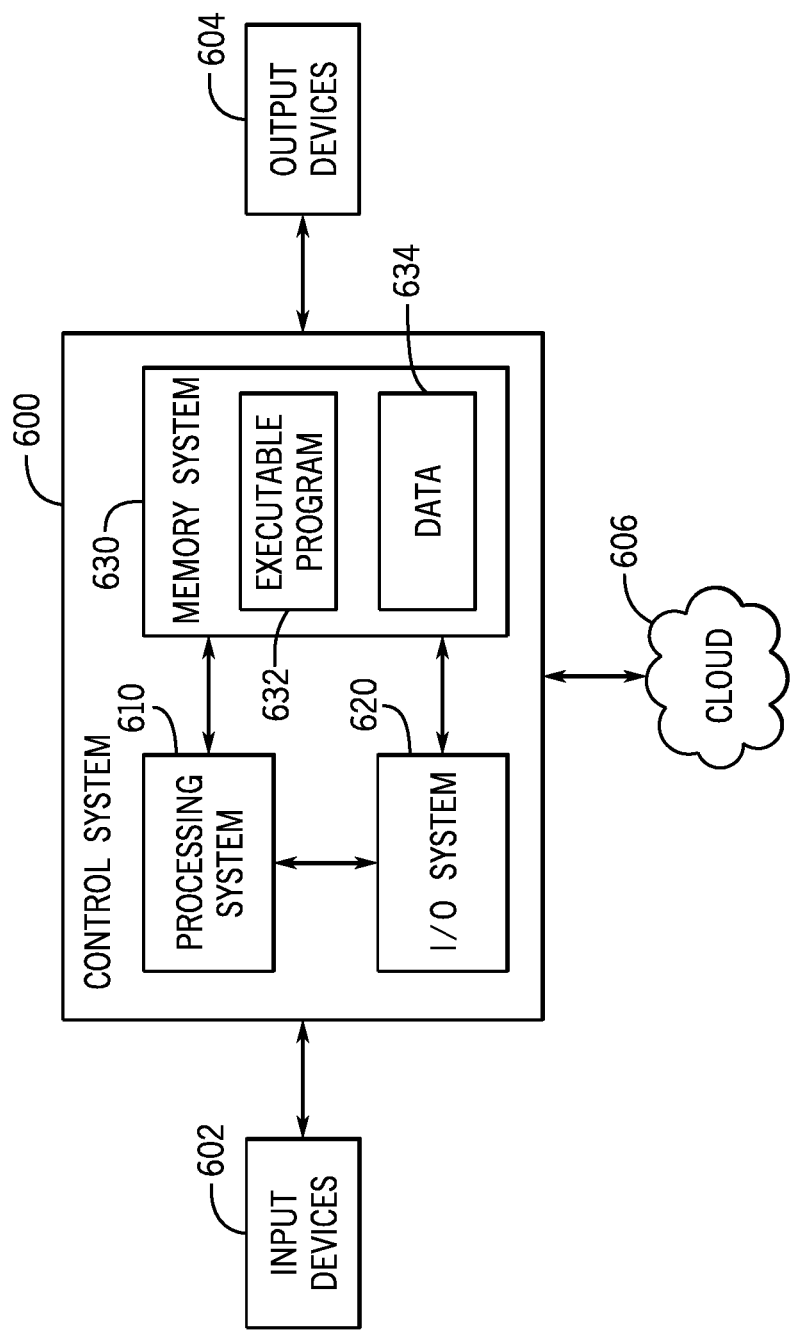
FIG. 6 depicts an exemplary control system for operating a frozen carbonated beverage system according to the present disclosure.

FIG. 6 depicts an exemplary control system 600 for operating a system 100 according to the present disclosure. The control system 600 communicates with input devices 602 (which may include pressure switches 108, for example), output devices 604 (such as the water valves 124), and/or a cloud 606 based network. In the exemplary control system 600 shown, an input/output (I/O) system 620 provides communication between the control system 600 and the input devices 602, output devices 604, and cloud 606, which may each be bidirectional in nature. A processing system 610 within the control system 600 is configured to execute information received from the I/O system 620 and also from the memory system 630. In the example shown, the memory system 630 includes an executable program 632 for operating the control system 600 and the system 100 more generally, as well as a data 634 module for storing such parameters as cut in and cut off pressures, as discussed above.

It should be recognized that certain aspects of the present disclosure are described and depicted, including within FIG. 6, in terms of functional and/or logical block components and various processing steps. It should be recognized that any such functional and/or block components and processing steps may be realized by any number of hardware, software, and/or firmware components configured to perform the specified functions. For example, certain embodiments employ various integrated circuit components, such as memory elements, digital signal processing elements, logic elements, look-up tables, or the like, which are configured to carry out a variety of functions under the control of one or more processors or other control devices. The connections between functional and logical block components are also merely exemplary. Moreover, the present disclosure anticipates communication among and between such components being wired, wireless, and through different pathways These functions may also include the use of computer programs that include processor-executable instructions, which may be stored on a non-transitory tangible computer readable medium. The computer programs may also include stored data. Non-limiting examples of the non-transitory tangible computer readable medium are nonvolatile memory, magnetic storage, and optical storage. As used herein, the term module may refer to, be part of, or include an application-specific integrated circuit (ASIC), an electronic circuit, a combinational logic circuit, a field programmable gate array (FPGA), a processor system (shared, dedicated, or group) that executes code, or other suitable components that provide the described functionality, or a combination of some or all of the above, such as in a system-on-chip. The term module may include memory (shared, dedicated, or group) that stores code executed by the processor. The term code, as used herein, may include software, firmware, and/or microcode, and may refer to programs, routines, functions, classes, and/or objects. The term shared, as used above, means that some or all code from multiple modules may be executed using a single (shared) processor. In addition, some or all code to be executed by multiple different processors as a computer system may be stored by a single (shared) memory. The term group, as used above, means that some or all code comprising part of a single module may be executed using a group of processors. Likewise, some or all code comprising a single module may be stored using a group of memories as a memory system.

Furthermore, certain elements are shown as singular devices for the sake of clarity, but may be combined or subdivided differently to perform the same function. For example, the processing system 610 may represent a single microprocessor, or a group of microprocessors functioning as a system. This also applies to the input/output (I/O) system 620 and memory system 630, which may also store information therein in greater or fewer groupings than is shown.

As shown in FIG. 4, the control system 600 determines the barrel 122 pressure in step 202 via inputs received from the pressure switch 108. The control system 600 then compares the barrel 122 pressure to the cut in and cut off values previous described. If the control system 600 determines that the pressure is below the cut off value, the control system 600 signals for the barrel 122 to be filled. To fill the barrel 122, the water valves 124, syrup valves 126, and CO2 valves 128 are opened to allow water, syrup concentrate, and CO2 to simultaneously flow into the barrel 122 together (see FIG. 2). The water 102 and syrup concentrate 104 are generally kept at a consistent ratio, set by manually adjusting water flow controls 130 and syrup concentrate flow controls 131. For beverage systems known in the art, water valves 124 and syrup valves 126 are controlled in tandem. Depending on the required amount of CO2, the CO2 valve 128 may open fully when the water valves 124 and syrup valves 126 are opened, or may open intermittently, such as via a specified duty cycle.

As shown in FIG. 2, the water 102, syrup concentrate 104, and CO2 106 pass through the liquid side 132 of an expansion tank 134. The expansion tank 134 is pressurized on the gas side 136 of an internal diaphragm 138, which allows for expansion of the liquid contents of the machine during freezing without damaging the rest of the rigid components within the machine. Liquid product is then delivered via beverage lines BL to enter the barrel 122 through a barrel inlet 140 (FIG. 1).

Continuing with reference to FIGS. 2 and 4, the state of the fill process 168 continues in step 206 (whether filling or not filling) as long as the barrel 122 pressure is between the cut in and cut off values. However, if the pressure in the barrel 122 is determined to be at or above the cut in value in step 208, the water valves 124, syrup valves 126, and CO2 valves 128 are all closed to stop the fill process 168 in step 210.

Figure 5:
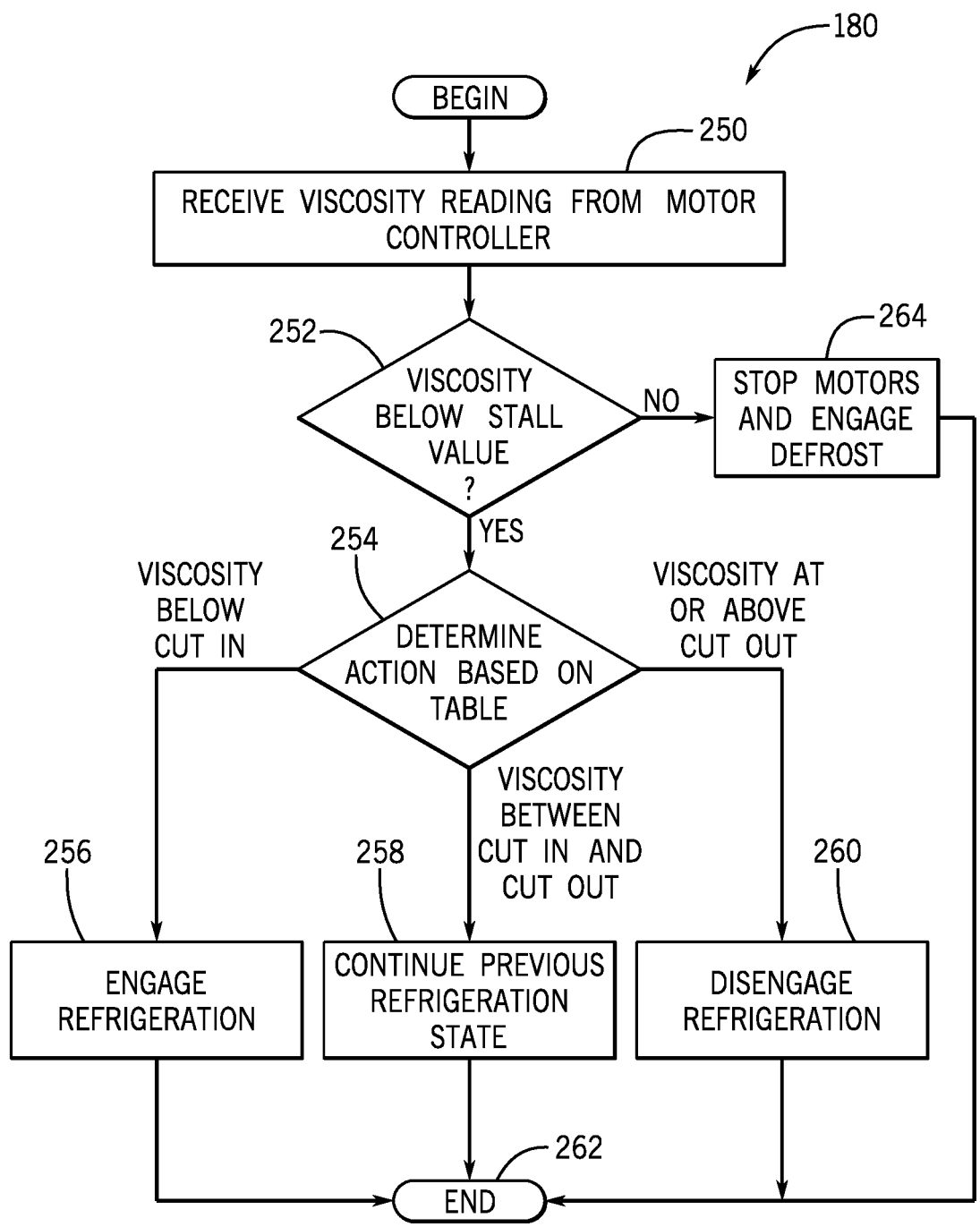
FIG. 5 depicts an exemplary process flow for refrigerating a frozen carbonated beverage system according to the present disclosure.

As shown in FIG. 5, a similar control process occurs in the refrigeration process 180 with respect to the refrigeration system 101B of FIG. 3. In particular, the viscosity of contents in the barrel 122 is used to determine whether the beverage therein requires more, less, or the same refrigeration at any given time. The viscosity is determined based on the power required to rotate the motor 142, which is read in step 250. The control system 600 (FIG. 6) then determines whether the viscosity falls below a stall value in step 252, based on comparison to a table stored within the data 634 of the memory system 630. If the viscosity is found to be greater than the stall value in step 252, the motor 142 is stopped in step 264 and a defrost process is started to melt the excessive ice causing the excessive viscosity within the barrel 122, ending at step 262.

If alternatively the viscosity is determined in step 252 to be below the stall value, the process continues with determining an action in step 254 based on whether the viscosity is below, above, or between cut in and cut out values (also stored in the data 634 of the memory system 630). If it is determined in step 254 that the viscosity is below the cut in value (meaning low), refrigeration is engaged in step 256, freezing additional content within the barrel 122 to increase the viscosity therein. If alternatively the viscosity is above a stored cut out value, refrigeration is discontinued in step 260 to prevent a further increase in viscosity. Finally, if the viscosity is determined in step 256 to be between the cut in and cut out values, the refrigeration process 180 continues the previous refrigeration step 258 and the process is repeated.

As shown in FIG. 3, the refrigeration system 101B includes a compressor 154 and condenser 156 for the system 100, as well as liquid line solenoid valves 158, hot gas solenoid valves 160, and expansion devices such as expansion valves 162 for each barrel evaporator 164. In this manner, the system 100 may supply refrigeration or heat to each barrel 122 independently. In freeze mode, the refrigeration system 101B draws heat out of the barrel 122 through the evaporator until the viscosity of the product meets a specified cut out value, as discussed above. As beverages are dispensed, product is pushed out of the dispense valve 166 (FIG. 1) by pressure within the barrel 122. As the barrel 122 pressure drops below a specified minimum fill pressure, the fill process 168 (FIG. 4) resumes until the pressure in the barrel 122 reaches a specified maximum fill pressure. During the fill process 168, liquid product enters the barrel 122 at ambient temperature through a barrel inlet 140 (FIG. 1). Heat therefore enters the barrel 122 through conduction and friction. As previously stated, the viscosity of the product decreases until it meets a specified cut in value, caused by this heat, until refrigeration begins again.

During the refrigeration process 180 previously discussed, ice crystals form on the inside wall 172 of the barrel 122 (FIG. 1), which are scraped off the wall 172 by the scraper blades 146. The present inventors have identified through experimentation and research that over time and through multiple refrigeration cycles, the ice crystals in the barrel 122 grow in size and stick together to form larger ice crystals, degrading the smooth texture of the drink produced by the system 100. As the barrel 122 contents rotate, higher density components are driven towards the perimeter of the barrel 122 via centripetal force, likewise forcing lower density components (such as larger ice crystals) towards the center of the barrel 122. This in turn results in larger formations of ice surrounding the beater bar 144, leading to undesired and/or inconsistent product.

After a specified time, the barrel 122 enters a defrost cycle where heat is added to the barrel 122 through the barrel evaporator 164 for a set duration, or until the temperature of the evaporator outlet 178 reaches a specified temperature. In certain examples, the intention of this defrost cycle is to fully melt all product in the barrel 122. From there, the refrigeration process 180 begins again until the viscosity of the product meets a specified cut out value, as discussed with respect to the process flow of FIG. 5.

The present inventors have identified that FCB systems presently known in the art are prone to several types of problems. For example, a problem arises when the pressure in a supply line 107 (such as water 102, syrup concentrate 104, or CO2 106) falls below a specified value. In this case, the dispensing machine 99 in certain systems 100 will disable the fill process 168 to prevent an improper mix of ingredients from entering the barrel 122. Likewise, problems arise when the viscosity of the barrel 122 exceeds a specified safety value intended to prevent damage to the system 100. In this case, the motor 142 is typically disabled and a defrost cycle begins to melt the excess ice that is presumed to be building up within the barrel 122.

The present disclosure further relates to improvements with respect to the refrigeration system 101B previously discussed and shown in FIG. 2. Environmental regulations are requiring a shift away from current refrigerants, such as R404a, to refrigerants with reduced impacts on global warming. A leading candidate refrigerant is R290 (propane). However, the present inventors have identified that the use of R290 within the application of frozen carbonated beverage (FCB) systems 100 poses several challenges. Due to the flammability of R290, the maximum charge size is limited to less than is typically required for a multi-barrel FCB system. Additionally, the procedures for working with R290 are different than those with R404a, providing a learning curve and requiring additional equipment for service technicians. Consequently, these create further barriers to accepting this new technology alternative.

Furthermore, manufacturing infrastructure to support safe storage and charging of R290 refrigerant can be expensive, often upwards of $400,000. The traditional frozen equipment manufacturing workflow requires significant assembly prior to charging such that the charging occurs at the point of final assembly. Likewise, servicing R290 refrigeration systems requires significantly more training and experience than other service tasks within the beverage equipment industry. This complexity of servicing frozen beverage dispensers limits available service options and creates further barriers to sales.

Additionally, installation of a refrigeration system with a remote condenser (such as on a roof) requires brazing refrigerant lines on site, vacuuming air out of the system, checking for leaks, and then charging with an appropriate amount of refrigerant. In some jurisdictions, regulations require that the technician must remain on-site for hours following brazing to ensure that no fires have been started. This again poses a significant cost for installation and maintenance.

Servicing the refrigeration system 101B of an FCB system 100 in the field entails moving a machine that can weigh in excess of 500 pounds, also requiring access to the sides or back of the machine prior to beginning work. This may require blocking a significant portion of a business with a lift in order to move the machine off a counter, for example. This may further create additional service costs by requiring two technicians on site to move the equipment.

Through research and experimentation, the present inventors have developed the presently disclosed systems and methods for incorporating refrigeration subsystems 500 within an opening in a base machine 499 to together form an FCB system 100 that allows for safe and efficient use of R290 refrigerant within this industry (see FIG. 1).

FIGS. 7A-7D depict exemplary embodiments of refrigeration subsystems 500 according to the present disclosure. The refrigeration system 500 has a body 550 with a top 551 and opposite bottom 552, left 553 and right 554, and front 555 and opposite back 556. As shown, one or more openings (such as barrel receivers 501) are defined within the front 555 of the refrigeration subsystem 500. However, the barrel receiver 501 may also be defined in other sides of the refrigeration subsystem 500. The barrel receiver 501 is configured to receive a barrel 122 as previously described, the barrel receiver 501 thereby functioning as an evaporator 164 within the refrigeration system 100. The refrigeration subsystem further includes a compressor 154, one or more expansion valve 162, and a condenser 156 and/or external cooling connectors (shown as 518, 520 like the fluid connectors 518, 520 previously discussed) to be coupled to an external cooler 506, which are fluidly connected via refrigerant lines RL and external refrigerant lines EXL (which may be the same as refrigerant lines RL). It should be recognized that the external chiller 506 may be a water line (i.e., water from a standard building water line that cools the system and feeds down a drain), a heat exchanged located outside the building, an external heat exchanged that is part of a chiller, an external heat exchanger cooled by water, and/or other chilling devices presently known in the art. In this manner, the refrigeration subsystem 500 is a modular device containing the minimum components needed for a sealed and charged refrigeration system 101B, which can be assembled and tested independently of the full FCB system 100. In this manner, the entire coolant circuit required for the refrigeration system 101B (FIG. 3) are provided within a single refrigeration subsystem 500 that can be deployed alone, or in conjunction with other refrigeration subsystems 500, within FCB systems 100. Moreover, installation and service of the FCB system 100 with respect to the refrigeration subsystems 500 is not impacted by the particular type of refrigerant contained therein.

Figure 13:
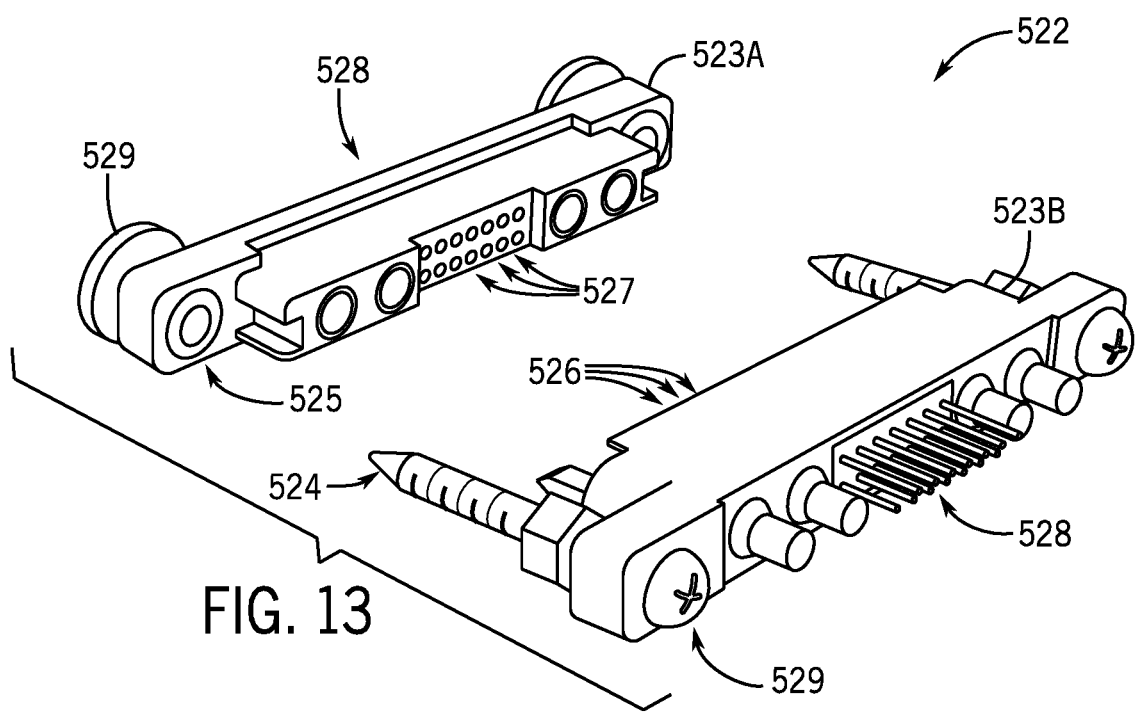
FIG. 13 depicts an exemplary blind mate electrical connectors for integrating the refrigeration subsystems within a frozen carbonated beverage system according to the present disclosure.
Figure 14:
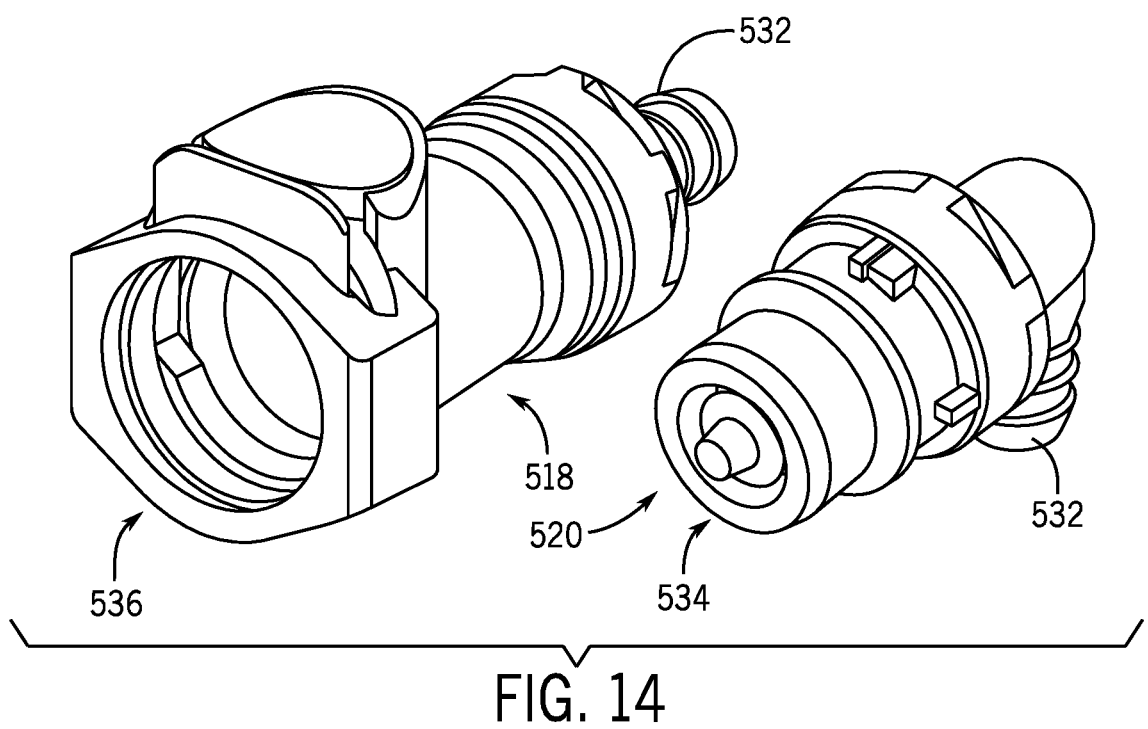
FIG. 14 depicts exemplary fluid connectors for integrating the refrigeration subsystems within a frozen carbonated beverage system according to the present disclosure.

The refrigeration subsystem 500 can therefore be removed and installed via the front of an otherwise completely assembled FCB system 100, connecting to the fill inlet 140 and motor 142 therein. In particular, the refrigeration subsystem 500 and FCB system 100 (which is configured to receive one or more refrigeration subsystems 500) may be configured with corresponding fluid connectors 518, 520 and electrical connectors 522 forming a press-to-connect type of connection therebetween with no tools required. In certain embodiments, such as shown in FIGS. 13 and 14, these fluid connectors 518, 520 and electrical connectors 522 are automatically-aligning, blind-mate connectors or other mating devices such that access is not required from the sides or back of the FCB system 100. As shown in FIG. 7D, this may be used to quickly couple the fill inlet 140 to the expansion tank 134 containing a beverage mixture therein via beverage lines BL having corresponding fluid connectors 518, 520. As shown in FIG. 7B, a motor receiver 143 may be defined within the back 556 of the refrigeration subsystem 500 to at least partially receive a portion of the motor 142 or motor coupling shaft 148 (FIG. 1).

FIG. 13 shows exemplary electrical connectors 522 in greater detail, which include a male side 523B that is received within a female side 523A in a customary manner. As shown, the electrical connectors 522 allow for blind mating by engagement between alignment pins 524 and receivers 525, which ensure mating between corresponding communications pins 526 and receivers 527. Internal terminals 528 and mounting hardware 529 are provided with each of the electrical connectors 522 for electrically and physically coupling the electrical connectors 522 to the system 100 and refrigeration subsystem 500. Exemplary blind mate connectors include those from the Tyco Electronics ELCON or AMP drawer series. This style connector self-aligns during connection and allows for sequencing connect/disconnect order of various pins for safety and damage prevention (i.e. connect ground before power).

FIG. 14 shows fluid connectors 518, 520 for fluidly coupling the refrigeration subsystem 500 to a system. Exemplary quick disconnect couplings include those from the CPC HFC 12 series. The fluid connectors 518, 520 are provided with self-sealing to prevent leaks therebetween, and to eliminate the need for accessing shutoff valves. In the example shown, the fluid connector 518 has a female end 536 configured to receive a corresponding male end 534 in the fluid connector 520. Barbed ends 532 are provided at opposite ends of each fluid connector 518, 520, for fluidly coupling the respective fluid connector 518, 520 to beverage lines BL (FIG. 2) of the system 100 and/or refrigeration subsystem 500.

The connections shown in FIGS. 13 and 14 may further contain electrical and/or mechanical mechanisms for detecting the presence of a refrigeration subsystem 500 being in place within the FCB system 100. By way of example, these may include mechanical switches, RFID tags and sensors, and/or the like. These additional detection devices allow the system 100 to provide for the appropriate response following installation or removal of the refrigeration subsystem 500. Such detected changes may impact logic by the control system 600 (FIG. 6) with respect to error codes, fan speed, and other mechanical systems, such as fluid routing. Preferred embodiment may include pins incorporated into electrical connector 522 to serve as ID jumpers for module presence and type.

Figure 8:
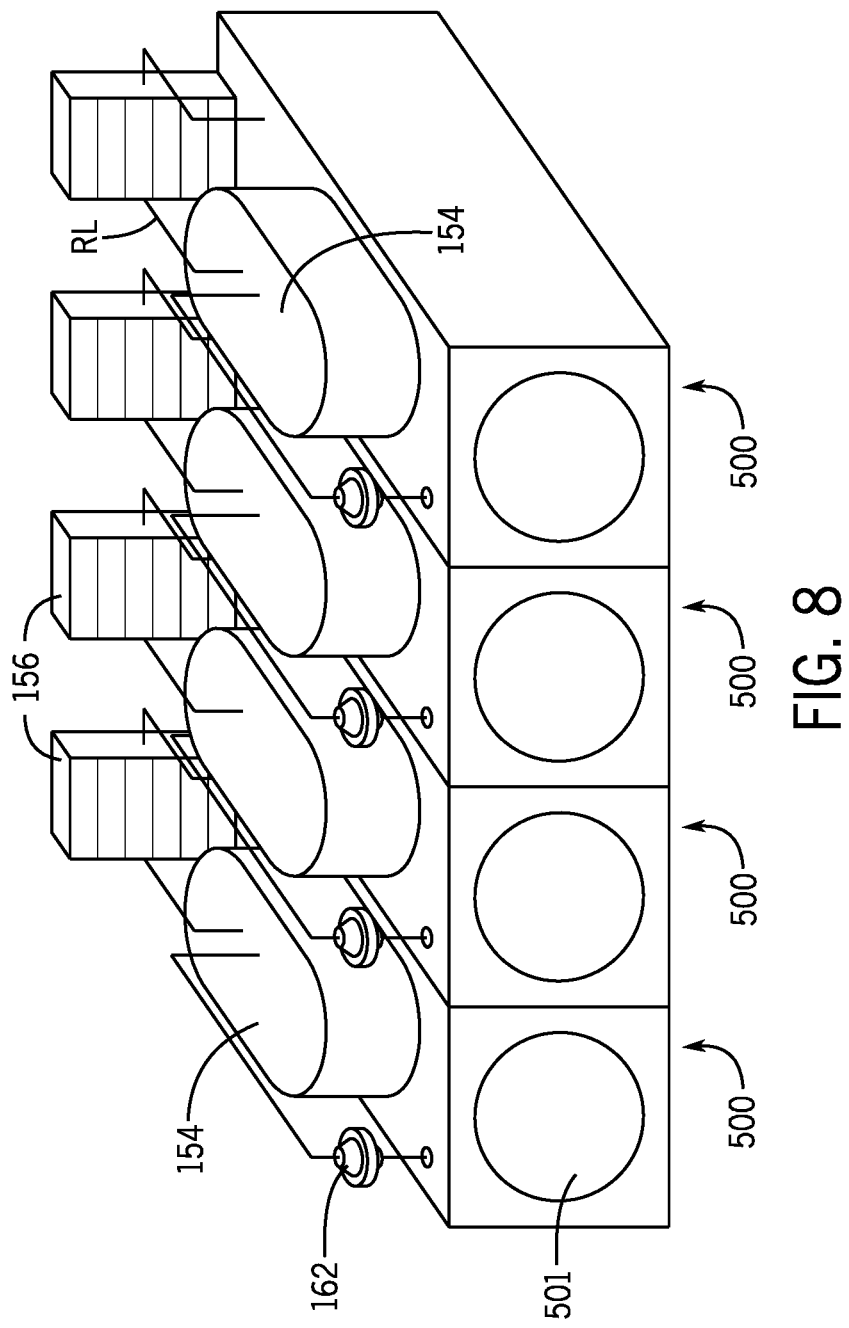
FIG. 8 depicts a configuration of multiple refrigeration subsystems configured to operate in parallel.

FIG. 8 depicts an exemplary configuration in which multiple refrigeration subsystems 500 are integrated for use in parallel, in this case for receiving four barrels 122 within the corresponding four barrel receivers 501. This configuration could be used for a system 100 having four corresponding beverages to be dispensed, for example. It should be recognized that while these refrigeration subsystems 500 are shown to be positioned side by side, other relative configurations are also anticipated by the present disclosure. Likewise, one or more refrigeration subsystems 500 may be configured to providing cooling other than via a barrel receiver 501, as is discussed further below.

Figure 9A:
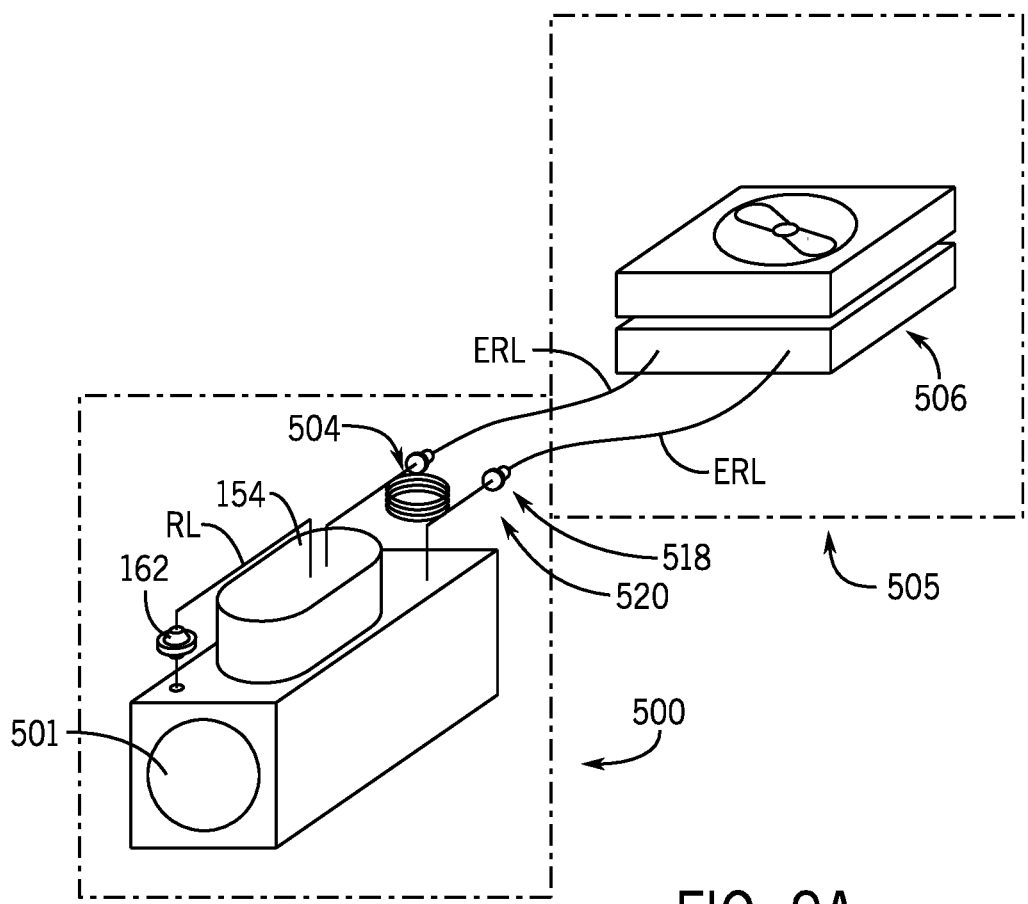
FIGS. 9A and 9B depict a refrigeration subsystem such as those shown in FIGS. 7C and 7A, respectively, in communication with external cooling components.
Figure 9B:
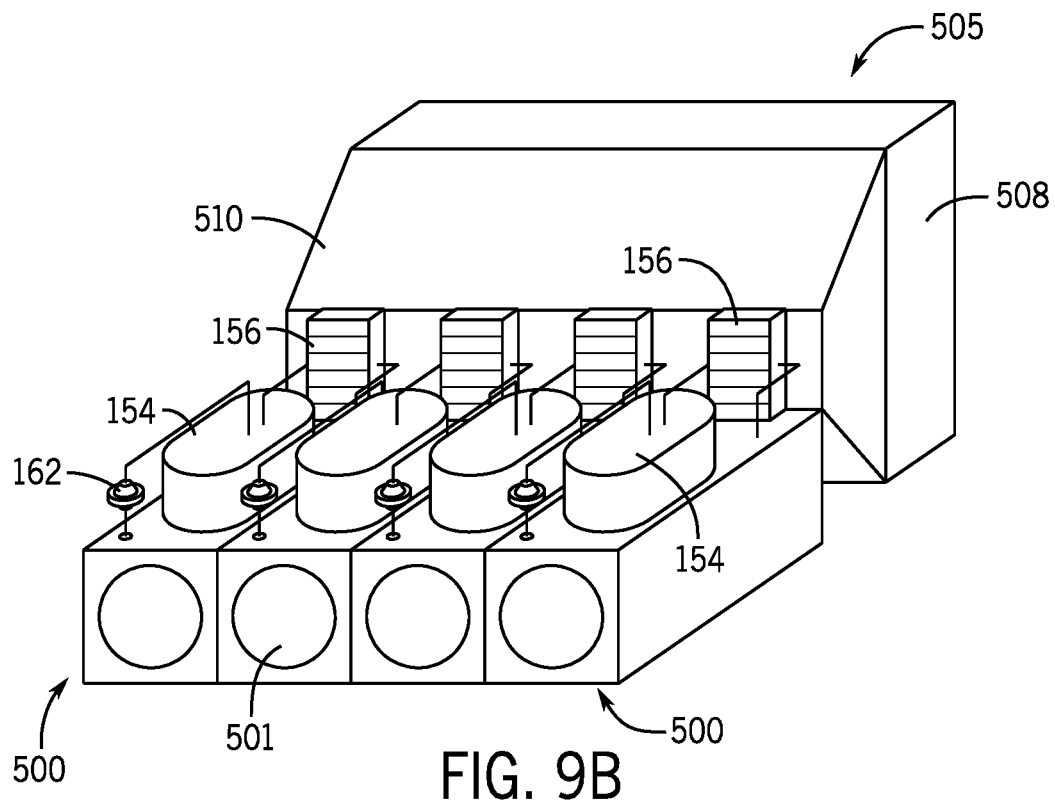

As shown in FIG. 9A, certain embodiments of refrigeration subsystems 500 are further coupled to external cooling components 505. Exemplary external cooling components 505 includes an external cooler 506 (such as those incorporated into General Air Products ACCPS020, for example, with a dry cooling tower), a fan based system 508 for cooling each of the refrigeration subsystems 500, and/or the like. In certain examples, as shown in FIG. 9B, the external cooling components 505 includes a fan based system 508 containing one or more fans therein that assist in cooling multiple refrigeration subsystems 500 via the duct 510. An exemplary fan is EBM S3G350-AN01-30.

Figure 10A:
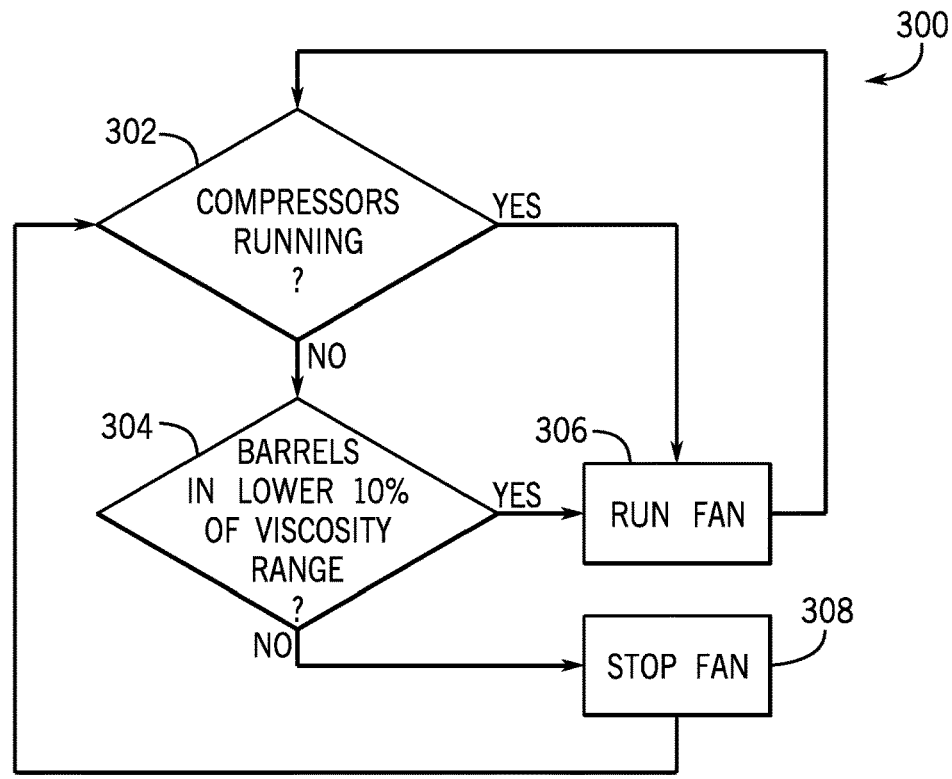
FIGS. 10A and 10B depict exemplary process flows for operating cooling fans in conjunction with a refrigeration system or refrigeration subsystem according to the present disclosure.

FIG. 10A shows an exemplary cooling process 300 for operating an external cooling components 505 (FIGS. 9A-9B) based on the state of the compressors 154. The control system 600 (FIG. 6) determines in step 302 whether any compressors 154 are running, also determining in step 304 whether any additional freezing is required in the barrel 122 (based on viscosity, as previously discussed). If compressors 154 are running and a freeze cycle is required, the fan will be commanded to run in step 306. However, the cooling process 300 may be configured such that if no freezing cycle is required, the fans of the external cooling component 505 are not operated, are operated at a lower speed, and/or the like. The present inventors have identified this to be advantageous with respect to power consumption, noise, and reliability of system 100 components.

Figure 11:
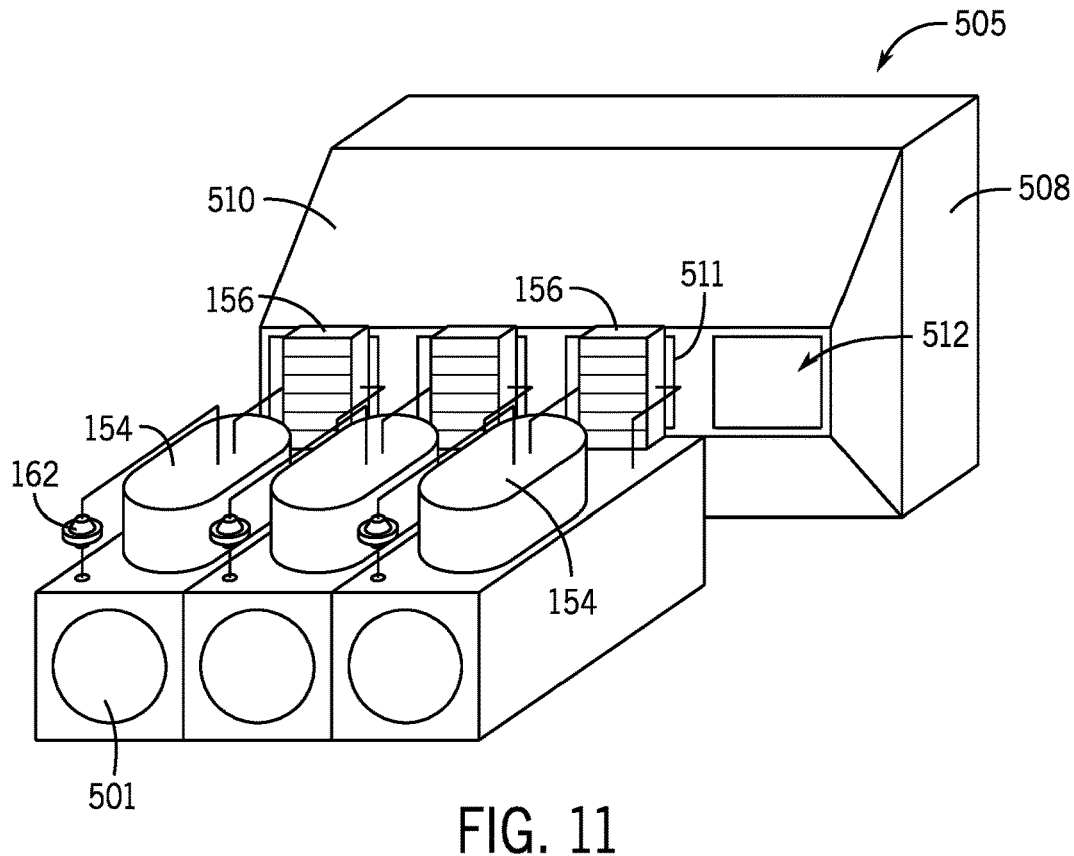
FIG. 11 depicts a configuration of multiple refrigeration subsystems operating in parallel and sharing a common external cooling component according to the present disclosure.
Figure 12A:
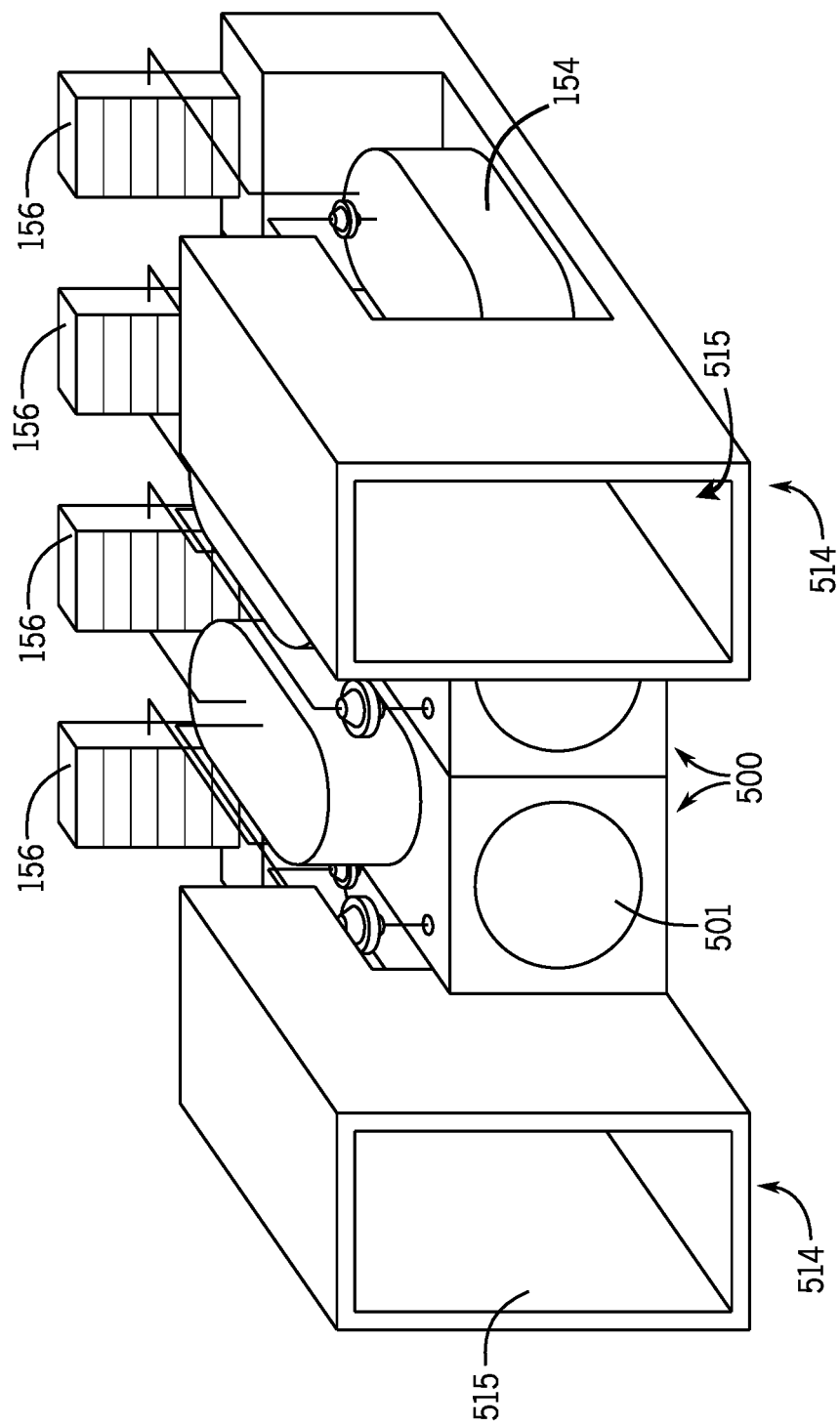
FIGS. 12A and 12B depict additional configuration of multiple refrigeration subsystems working in parallel according to the present disclosure.
Figure 12B:
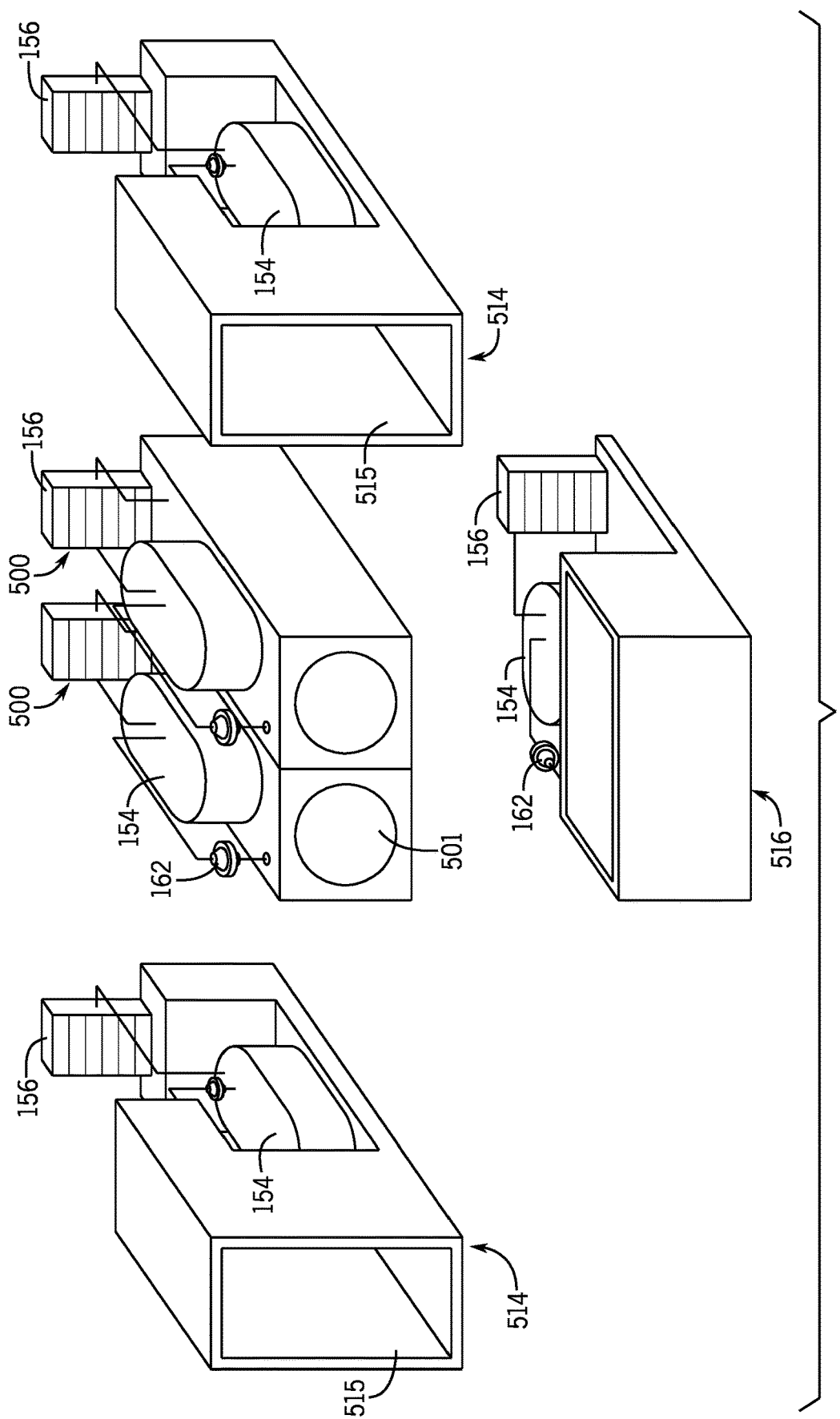

Further exemplary configurations of refrigeration subsystems 500 are shown in FIGS. 11-12B, which depict not only refrigeration subsystems 500 configured to accept a barrel 122 within the barrel receiver 501, but also embodiments such as refrigerated cabinets 514 having openings 515 defined therein for receiving other items to be cooled. As shown in FIG. 12B, this further includes embodiments configured as an ice bank 516, once again incorporating an independently operated cooling system of an expansion valve 162, compressor 154, and condenser 156 (or other external cooler 506). These configurations are discussed further below.

In this manner, the systems and methods of the present disclosure allow for replacement of a full refrigeration system in the field by a single technician, without requiring the skill, time, or risk of brazing. The refrigeration subsystem 500 is also configurable to be common across an entire product line such that service inventory is minimized and the learning curve for technicians streamlined. Furthermore, the refrigeration subsystems 500 may be manufactured, serviced, refurbished, remanufactured, and tested in a facility optimized for handling R290 refrigerant, rather than requiring expensive equipment to be on site or in additional locations. Moreover, the presently disclosed systems and methods allow for use of multiple smaller refrigeration subsystems 500 to collectively serve as the refrigeration system 101B of a system 100, whereby each refrigeration system remains below the maximum charge limit.

As discussed above, each refrigeration subsystem 500 may have a conventional refrigerant to air condenser 156 to eject heat from the refrigerant directly into the air, or may have a refrigerant to liquid condenser 504 to transfer heat to an intermediate fluid (water, glycol, or the like) and a separate fluid cooler to eject heat from the fluid to the air. This latter arrangement is particularly advantageous for remote condenser applications, as it avoids the need to braze or charge refrigerant on site, while also maintaining the small charge size and allowing simplified servicing. Multiple refrigeration subsystems 500 can utilize a single fluid cooler circuit with connections in the machine consistent with removal of a single subsystem, without disrupting function of the remainder of the unit. Additionally, reinstallation and bleeding of the system also requires no additional tools. For these reasons, the present inventors have identified a need for the presently disclosed refrigeration subsystems 500 not only for the production of new systems 100, but also as a replacement or upgrade kit for systems 100 presently in the field.

In a configuration in which a conventional condenser 156 is provided for each barrel 122 (such as shown in FIG. 11), a single fan may be provided within the housing of the fan based system 508 may be used to cool all condensers 156. This fan based system 508 may align the flow of air with the condensers 156 directly, or may use a duct 510 to optimize air flow across the condensers 156. The fan or fans within the fan based system 508 may then be operated as needed, based on whether and how many condensers 156 are running.

Figure 10B:
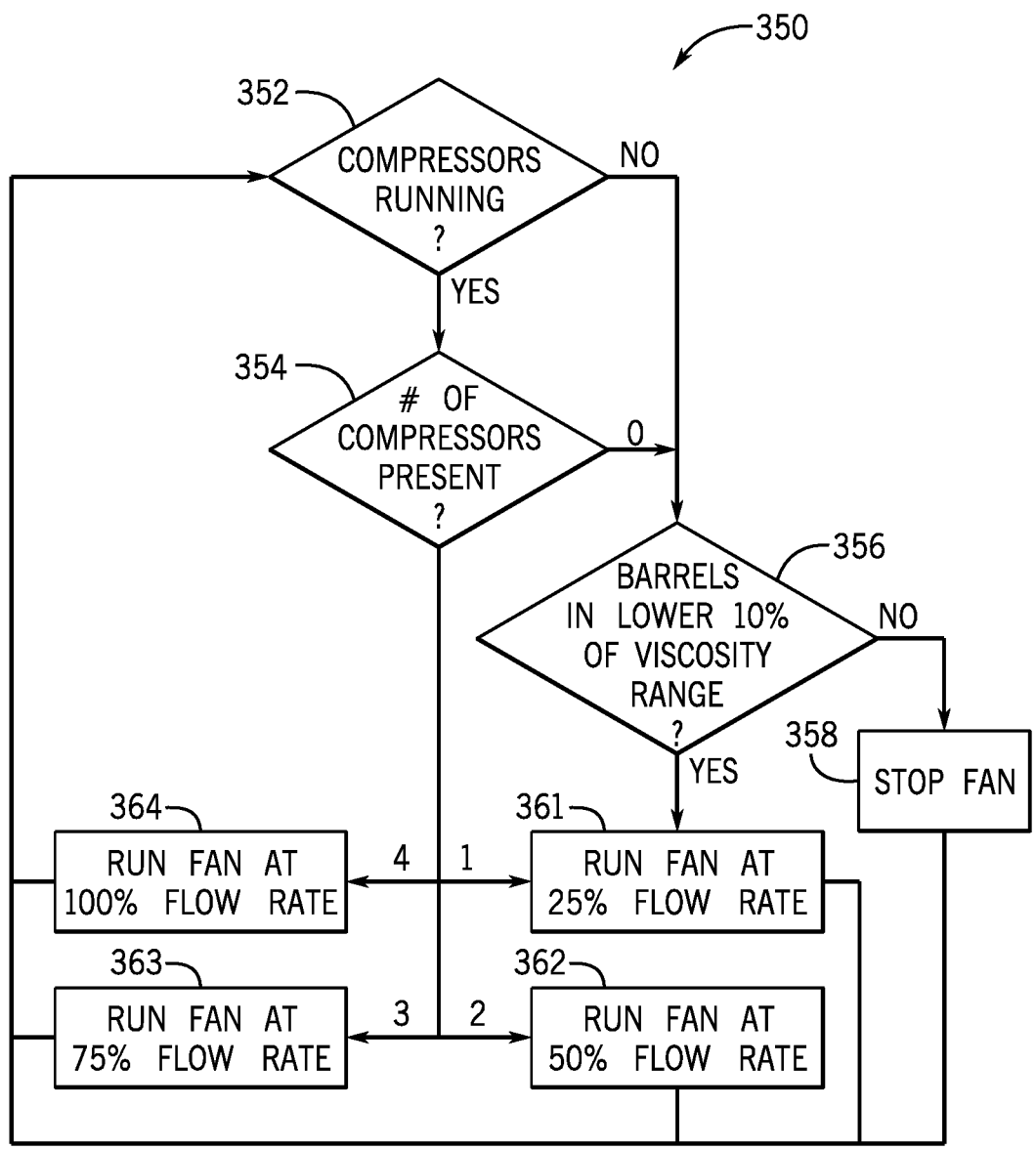

For example, FIG. 10B shows a cooling method 350 in which operation of the fan based system 508 depends upon the number of compressors 154 in operation, as well as the viscosity within the barrel 122 as previous described with respect to FIG. 10A. In step 352, the control system 600 (FIG. 6) determines whether any compressors 154 are running, and if so the number of compressors 154 running in step 354 (and/or the speed at which each is running). If it is determined in step 356 that further freezing is required within the barrel 122, the one or more fans within the fan based system 508 are then operated at different rates depending upon the number of compressors 154 present, as exemplified in steps 361-364.

The present inventors have identified further advantages of the presently disclosed systems and methods relating to the cooling of components, including the condensers 156. As shown in FIG. 10A, the cooling process 300 provides the ability to reduce the number of start/stop cycles of one or more fans within a fan based system 508 by identifying when refrigeration is about to end, but also estimating a high likelihood of another condenser 156 starting up soon. For example, if all condensers 156 presently operating are about to stop, but the barrel 122 associated with another compressor 154 is within the bottom ten percent of its viscosity range (indicating a need for further freezing is imminent), the control system 600 (FIG. 6) may control the system 100 to keep the fan on during this brief duration. Avoiding this stop/start cycle may therefore improve the reliability and lifespan of the one or more fans involved.

As shown in FIG. 11, openings 511 are defined within the fan based system 508 and aligned to provide airflow for cooling the condenser 156 of a refrigeration subsystem 500 positioned near the fan based system 508. It should be recognized that the refrigeration subsystem 500 in certain embodiments is coupled to the fan based system 508, which in certain examples also incorporates the electrical connections 502 and/or fluid connections 518, 520 previously discussed (FIGS. 13-14). It should also be recognized that the relative positions between the refrigeration subsystem 500 and the fan based system 508 may vary, such as the fan based system 508 directing airflow downwardly onto the condenser 156, for example.

In certain embodiments, a flap 512 or other closure device (which may be spring-loaded to automatically close when no corresponding refrigeration subsystem 500 is installed therewith, for example), covers the opening 511 in the fan based system 508 when a refrigeration subsystem 500 is removed. This prevents inefficiency from air flowing through what would otherwise be an opening in the fan based system 508, which would reduce airflow across the other condensers 156. In this situation, the present inventors have identified that it is further desirable in certain embodiments to also vary the speed of the one or more fans within the fan based system 508 based on the number of refrigeration subsystems 500 installed therein (versus openings 511 that are blocked by flaps 512). This is achieved by the control system 600 (FIG. 6) recognizing how many refrigeration subsystems 500 are connected to the system 100 at any given time. Consequently, the fan based system 508 ensures a constant airflow rate across all condensers 156 for any number of refrigeration subsystems 500 coupled thereto.

In further embodiments, such as those shown in FIGS. 12A-13, a single refrigeration subsystem 500 is configured to accept multiple variants of refrigeration subsystems 500. In one example, a product requiring refrigeration of the syrup concentrate 104 prior to mixing and freezing in the barrel 122 may be produced using a combination of a refrigeration subsystems 500 having barrel receivers 501, as well as other refrigeration subsystems in the form of refrigerated cabinets 514. The refrigerated cabinets are configured to store the syrup concentrate 104 within the opening 515 therein. The arrangement may be such that electrical connections 522 (FIG. 13), product connections (i.e., to the barrel inlet 140), and condenser 156 positions are identical across all locations of refrigeration subsystems such that refrigeration subsystems 500 may be moved and changed over time within a system 100. In another configuration, an ice bank 516 type of refrigeration subsystem 500 (FIG. 12B) may be installed to provide a pre-chilling for water in the system 100, for example.

In certain embodiments, the system 100 plumbing may incorporate a bypass for the pre-chiller that is actuated by the presence or absence of the ice bank 516. In this manner, the installation of the ice bank 516 automatically diverts the flow of incoming water 102 through the pre-chiller, while removal of the ice bank 516 module automatically diverts water past it. In certain embodiments, a latch (not shown) enables removal of the pre-chiller and may also engage the bypass of water. In other examples, a spring-loaded valve may have an opening force such that it is closed when the pre-chiller is present, but open when the pre-chiller is removed and water is forced through the valve. In other examples, electronic valves are incorporated to control the water flow path and also to engage bypass when the pre-chiller is detected to be removed.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A refrigeration subsystem configured to be removably received within a base machine to cool an object, the refrigeration subsystem comprising:
    a body that defines an opening configured to at least partially receive the object therein;
    an evaporator configured to thermally communicate with the object, wherein the object is cooled by the refrigerant flowing through the evaporator, wherein the evaporator is coupled to the body and moves therewith;
    a compressor that receives the refrigerant downstream of the evaporator and increases a pressure of the refrigerant, wherein the compressor is coupled to the body and moves therewith;
    a condenser that receives the refrigerant downstream of the compressor, wherein the refrigerant is cooled by flowing through the condenser, wherein the condenser is coupled to the body and moves therewith;
    an expansion device that receives the refrigerant downstream of the condenser and decreases the pressure of the refrigerant, wherein the evaporator receives the refrigerant downstream from the expansion device, wherein the expansion device is coupled to the body and moves therewith; and
    a refrigerant circuit that fluidly couples the evaporator, the compressor, the condenser, and the expansion device such that the refrigerant flows therebetween;
    wherein the refrigerant circuit forms a closed loop that remains unbroken when the body of the refrigerant subsystem is removed from the base machine;
    wherein the body has a front and the opening is defined within the front, the body further comprising electrical connections configured to electrically couple the compressor to corresponding electrical connections on the base machine, and wherein the compressor, the condenser, and the expansion device are coupled to the body other than on the front.

2. The refrigeration subsystem according to claim 1, wherein the object is a barrel configured to contain a beverage, wherein the barrel receives the beverage from the base machine, and wherein the refrigeration subsystem cools the beverage within the barrel.

3. The refrigeration subsystem according to claim 1, wherein the electrical connections are positioned on a back of the body that is opposite the front, and wherein the electrical connections are configured to mate with the electrical connections on the base machine via blind-mating.

4. The refrigeration subsystem according to claim 1, wherein the object to be cooled is configured to retain a liquid therein, and wherein the liquid enters the object via an inlet defined therein, further comprising a fluid connection configured to fluidly couple the base machine to the inlet of the object.

5. The refrigeration subsystem according to claim 1, further comprising external cooling connectors configured to be coupled to an external cooler, wherein the external cooler provides further cooling of the refrigeration subsystem when coupled thereto.

6. A refrigeration subsystem configured to be removably received within a base machine to cool an object, the refrigeration subsystem comprising:
    a body that defines an opening configured to at least partially receive the object therein;
    an evaporator configured to thermally communicate with the object, wherein the object is cooled by the refrigerant flowing through the evaporator, wherein the evaporator is coupled to the body and moves therewith;
    a compressor that receives the refrigerant downstream of the evaporator and increases a pressure of the refrigerant, wherein the compressor is coupled to the body and moves therewith;
    a condenser that receives the refrigerant downstream of the compressor, wherein the refrigerant is cooled by flowing through the condenser, wherein the condenser is coupled to the body and moves therewith;
    an expansion device that receives the refrigerant downstream of the condenser and decreases the pressure of the refrigerant, wherein the evaporator receives the refrigerant downstream from the expansion device, wherein the expansion device is coupled to the body and moves therewith; and
    a refrigerant circuit that fluidly couples the evaporator, the compressor, the condenser, and the expansion device such that the refrigerant flows therebetween;
    wherein the refrigerant circuit forms a closed loop that remains unbroken when the body of the refrigerant subsystem is removed from the base machine;
    wherein the body has a front and the opening is defined within the front, and wherein the compressor, the condenser, and the expansion device are coupled to the body other than on the front;
    wherein the object to be cooled is configured to retain a liquid therein, and wherein the liquid enters the object via an inlet defined therein, further comprising a fluid connection configured to fluidly couple the base machine to the inlet of the object; and
    wherein the fluid connection is positioned on a back of the body that is opposite the front, and wherein the fluid connection is configured to mate with the base machine via blind-mating.

7. A refrigeration system for cooling an object, the refrigeration system comprising:
    a refrigeration subsystem comprising:
        a body that defines an opening configured to at least partially receive the object therein;
        an evaporator configured to thermally communicate with the object, wherein the object is cooled by the refrigerant flowing through the evaporator, wherein the evaporator is coupled to the body and moves therewith;

a compressor that receives the refrigerant downstream of the evaporator and increases a pressure of the refrigerant, wherein the compressor is coupled to the body and moves therewith;

a condenser that receives the refrigerant downstream of the compressor, wherein the refrigerant is cooled by flowing through the condenser, wherein the condenser is coupled to the body and moves therewith;

an expansion device that receives the refrigerant downstream of the condenser and decreases the pressure of the refrigerant, wherein the evaporator receives the refrigerant downstream from the expansion device, wherein the expansion device is coupled to the body and moves therewith; and a refrigerant circuit that fluidly couples the evaporator, the compressor, the condenser, and the expansion device such that the refrigerant flows therebetween;

a base machine configured to removably receive the refrigeration subsystem; and an external cooler configured to provide further cooling of the refrigeration subsystem, wherein the external cooler is coupled to the base machine and remains therewith when the refrigeration subsystem is removed from the base machine;

wherein the refrigerant circuit forms a closed loop that remains unbroken when the body of the refrigerant subsystem is removed from the base machine.

8. The refrigeration system according to claim 7, wherein the base machine provides power to the refrigeration subsystem, wherein the object is configured to contain a liquid therein, wherein the base machine provides the liquid to the object, and wherein the refrigeration subsystem is configured to cool the liquid within the object.

9. The refrigeration system according to claim 7, wherein the body of the refrigeration subsystem has a front and the opening is defined within the front, and wherein the compressor, the condenser, and the expansion device are coupled to the body other than on the front.

10. The refrigeration system according to claim 7, wherein the refrigerant is a hydrocarbon refrigerant.

11. The refrigeration system according to claim 7, further comprising electrical connections on each of the base machine and the refrigeration subsystem that are configured to be electrically coupled together.

12. The refrigeration system according to claim 11, wherein the electrical connections are electronically coupled via blind-mating when the refrigeration subsystem is being received in the base machine.

13. The refrigeration system according to claim 7, wherein the object to be cooled is configured to retain a liquid therein, further comprising fluid connections on each of the base machine and the refrigeration subsystem that are configured to be communicate the liquid from the base machine to the object, wherein the refrigeration subsystem is configured to cool the liquid within the object.

14. The refrigeration system according to claim 13, wherein the fluid connections are fluidly coupled via blind-mating when the refrigeration subsystem is being received in the base machine.

15. The refrigeration system according to claim 7, wherein the external cooler is a fan-based system configured to provide airflow to the refrigeration subsystem.

16. The refrigeration system according to claim 7, wherein the refrigeration subsystem is a multiple refrigeration subsystems, and wherein the base machine is configured to receive the multiple refrigeration subsystems.

17. The refrigeration system according to claim 16, wherein the external cooler is a fan-based system configured to provide airflow to the refrigeration subsystem, wherein the base machine has a control system for controlling operation of the external cooler, and wherein the control system is configured to operate the fan-based system at different speeds depending on how many of the multiple refrigeration subsystems are operating.

* * * * *